(12) United States Patent
Lee

(10) Patent No.: US 6,493,044 B1
(45) Date of Patent: Dec. 10, 2002

(54) DIGITAL KEYSTONE MODULATION CIRCUIT

(75) Inventor: Tian-Quey Lee, Hsinchu (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/321,975

(22) Filed: May 28, 1999

(30) Foreign Application Priority Data

Jun. 1, 1998 (TW) ..................................... 87208608 U

(51) Int. Cl.⁷ .................................................. H04N 3/23
(52) U.S. Cl. ........................ 348/746; 348/745; 348/747
(58) Field of Search ............................... 348/745, 746, 348/747; H04N 3/23

(56) References Cited

U.S. PATENT DOCUMENTS

| | | | | |
|---|---|---|---|---|
| 5,532,764 A | * | 7/1996 | Itaki | 348/745 |
| 5,752,758 A | * | 5/1998 | Woo | 353/69 |
| 5,764,311 A | * | 6/1998 | Bonde et al. | 348/745 |
| 5,795,046 A | * | 8/1998 | Woo | 353/69 |
| 5,883,476 A | * | 3/1999 | Noguchi et al. | 315/368.12 |
| 6,219,011 B1 | * | 4/2001 | Aloni et al. | 345/1.3 |

* cited by examiner

Primary Examiner—John Miller
Assistant Examiner—Brian Yenke

(57) ABSTRACT

A digital keystone modulation circuit for transforming a digital image to a digital projection image is disclosed. The digital image and the digital projection image have n horizontal image signals and n horizontal projection image signal respectively. The digital keystone modulation circuit includes an output controller for outputting a $(3k-1)^{th}$ image signal and one of a $(3k-2)^{th}$ and $(3k)^{th}$ image signal in response to an output image selected signal, an output image selector for outputting a first counting signal and the output image selected signal in response to a localization sync-signal, a first counting controller for counting in response to the counting signal, a $k^{th}$ horizontal projection image frequency, and a dot number of one of the $(3k-2)^{th}$ and $(3k-1)^{th}$ image signal, a second counting controller for counting in response to the output image selected signal, the $k^{th}$ horizontal projection signal, and a dot number of the $(3k-1)^{th}$ image signal, and a projection image frequency generator for outputting the $k^{th}$ projection image frequency in response to a horizontal sync-signal and a sum of the dot numbers of the $(3k-2)^{th}$, $(3k-1)^{th}$, and $(3k-1)^{th}$ image signals.

46 Claims, 9 Drawing Sheets

DIGITAL KEYSTONE MODULATION CIRCUIT

FIELD OF THE INVENTION

The present invention relates to a digital keystone modulation circuit, and especially to a digital keystone modulated circuit for transforming a digital image into a digital projection image.

BACKGROUND OF THE INVENTION

A conventional optical projector is gradually replaced with a electronic projector. By scanning the original object, the electronic projector can generate a digital image and project it on a display directly. The operating process of the conventional electronic projector are shown in FIG. 1. At first, an analog signal is generated after scanning an object (step S11). Then, the analog signal is transformed into a digital image signal through an analog-to-digital transformation (step S12) and the digital image signal is stored in a memory (step S13). Finally, through a digital-to-analog transformation, the digital image signal is converted to a projection image signal projected on the display (step S14).

However, the projection image on the display usually is deformed as shown in FIG. 2. Because the traveling length of light at the top and bottom of the display is changed with the projection angle θ, the projection image is deformed and has a shape of a trapezoid. This is usually called a keystone deformation. FIG. 2 shows a normal projection image without the keystone deformation and the shape constructed by the four points A, B, C, D is a rectangle. If the projection angle θ is an elevation angle, as shown in FIG. 2(b), the distance between the points B1 and C1 is extended and the distance between the points A1 and D1 is shortened. If the projection angle θ is a dip angle, as shown in FIG. 2(c), the distance between the points B1 and C1 is decreased and the distance between the points of A1 and D1 is increased.

Although the keystone deformation can be solved by adding a set of optical lens in the projection image output unit to change the refracting angle of light, adding these optical lens will greatly increase the cost of the electronic projector. In addition, the optical lens will enlarge the size of the electronic projector which does not meet the current requirement of small size. It is therefore attempted by the applicant to provide a low-cost and effective electronic projector to deal with the keystone deformation encountered with the prior art.

SUMMARY OF THE INVENTION

An object of the present invention is to provide a digital keystone modulation circuit to modulate the keystone deformation in an electronic projector when a digital image is transformed into a digital projection image.

The digital image and the digital projection image is formed by n horizontal image signals and n horizontal projection image signals respectively wherein n is a positive integer. The digital keystone modulation circuit of the present invention includes an output controller, an output image selector, a first counting controller, a second counting controller, and a projection image frequency generator. The output controller is used for outputting a $(3k-1)^{th}$ image signal and a $(3k-2)^{th}$ or a $(3k)^{th}$ image signal in response to a first and a second state of an output image selected signal respectively. The $(3k-2)^{th}$, the $(3k-1)^{th}$, and the $(3k)^{th}$ image signals make up a $k^{th}$ horizontal projection image signal wherein k is a positive integer, $1 \leq k \leq n$, and the $(3k-1)^{th}$ image signal is a $k^{th}$ horizontal image signal. The output image selector is electrically connected to the output controller for outputting a first counting signal in an enable state and the output image selected signal in the second state in response to a horizontal localization sync-signal from a microprocessor. The first counting controller is electrically connected to the microprocessor and the output image selector for counting in response to the first counting signal in the enable state, a $k^{th}$ horizontal projection image frequency, and a dot number of the $(3k-2)^{th}$ or $(3k)^{th}$ image signal from the microprocessor, and outputting a first transforming signal to transform the first counting signal into a disable state and the output image selected signal into the first state after a first counting time. The second counting controller is electrically connected to the microprocessor and the output image selector for counting numbers in response to the output image selected signal in the first state, the $k^{th}$ horizontal projection image frequency, and a dot number of the $(3k-1)^{th}$ image signal, and outputting a second transforming signal to transform the output image selected signal into the second state after a second counting time. The projection image frequency generator electrically connected to the microprocessor, the first counting controller, and the second counting controller for outputting the $k^{th}$ horizontal projection image frequency in response to a horizontal sync-signal and a sum of the dot numbers of the $(3k-2)^{th}$, $(3k-1)^{th}$, and $(3k)^{th}$ image signals from the microprocessor.

According to the present invention, the keystone modulation circuit further includes a memory and a modulated signal generator electrically connected to the output controller. The microprocessor and the memory can be set in the electronic projector, and the modulated signal generator is preferably a grounded port. Therefore, the digital image can be stored in the memory.

In accordance with the present invention, the $(3k-2)^{th}$ and the $(3k)^{th}$ image signal are black image signals and the output controller comprises a multiplexer. The multiplexer is preferably a 2-to-1 multiplexer having a multiplex output control port to input the output image selected signal. The first state and the second state of the output image selected signal are a low voltage level or a high voltage level.

According to the present invention, the output image selector includes a first flip-flop, a second flip-flop, and a transforming signal output controller. The first flip-flop is electrically connected to the microprocessor and the first counting controller for outputting the first counting signal in the enable state to the first counting controller in response to the horizontal localization sync-signal and transforming the first counting signal in the enable state into the disable state in response to the first transforming signal. The second flip-flop is electrically connected to the microprocessor, the second counting controller, and the output controller for outputting the output image selected signal in the second state to the second counting controller in response to horizontal localization sync-signal and to the output controller to control the output of the $(3k-2)^{th}$ or $(3k)^{th}$ image signal. The transforming signal output controller is electrically connected to the first counting controller, the second counting controller, and the second flip-flop for logically controlling the outputs of the first transforming signal and the second transforming signal to control the transformation of states of the output image selected signal.

Preferably, the first flip-flop includes a pre-set port for inputting the horizontal localization sync-signal, a data input port for being grounded, a clock port for inputting the first transforming signal, and an inverting output port for outputting the first counting signal. The second flip-flop includes a pre-set port for inputting the horizontal localization sync-signal, a data input port electrically connected to an inverting output port, a clock port for inputting the first or the second transforming signal, and an output port for outputting the output image selected signal. The transforming signal output controller is an assembling logic generator, preferably an OR gate.

Preferably, the first counting controller is a first counter and the first counter is a down-counter. The first counter includes a data input port for inputting the dot number of the $(3k-2)^{th}$ or $(3k)^{th}$ image signal, a clock port for inputting the $k^{th}$ horizontal projection image frequency, an enable port for inputting the first counting signal, and an output port for outputting the first transforming signal.

Preferably, the second counting controller is a second counter and the second counter is preferably a down-counter. The second counter includes a data input port for inputting the dot number of the $(3k-1)^{th}$ image signal, a clock port for inputting the $k^{th}$ horizontal projection image frequency, an enable port for inputting the output image selected signal, and an output port for outputting the second transforming signal.

In accordance with the present invention, the first counting time is the dot number of the $(3k-2)^{th}$ or $(3k)^{th}$ image signal divided by the $k^{th}$ horizontal projection image frequency. The second counting time is the dot number of the $(3k-1)^{th}$ image signal divided by the $k^{th}$ horizontal projection image frequency.

Preferably, the enable state and the disable state of the first counting signal are a low voltage level or a high voltage level. The first and second transforming signals are a positive pulse and a negative pulse respectively or a negative pulse and a positive pulse respectively.

In accordance with the present invention, the projection image frequency generator includes a phase-locked loop generator and a frequency divider. The phase-locked loop generator is electrically connected to the microprocessor, the first counting controller, and the second counting controller for outputting the $k^{th}$ horizontal projection image frequency to the first and the second counting controllers in response to a divided frequency. The frequency divider is electrically connected to the microprocessor and the phase-locked loop generator for inputting the divided frequency to the phase-locked loop generator in response to the horizontal sync-signal from the microprocessor, the sum of the dot numbers of the $(3k-2)^{th}$, $(3k-1)^{th}$, and $(3k)^{th}$ image signals, and the $k^{th}$ horizontal projection image frequency.

Preferably, the frequency divider is a third counter and the third counter is a down-counter. The third counter includes a load port for inputting the horizontal sync-signal, a data input port for inputting the sum of the dot numbers of the $(3k-2)^{th}$, $3k-1)^{th}$, $(3k)^{th}$ image signals, a clock port for inputting the $k^{th}$ horizontal projection image frequency, an enable port for inputting an enable signal, and an output port for outputting the divided frequency.

According to the present invention, the dot numbers of the $(3k-2)^{th}$ and the $(3k)^{th}$ image signals are changed with a projection angle $\theta$ and a number n of the horizontal image signal. Both of the dot numbers of the $(3k-2)^{th}$ and $(3k)^{th}$ image signals are $(n-k+1) \times \tan \theta$.

In accordance with the present invention, the digital keystone modulation circuit further includes an initial image modulated dot number storage and an image dot decreasing coefficient storage. The initial image modulated dot number storage is electrically connected to the microprocessor and the first counting controller for outputting the dot number of the $(3k-1)^{th}$ or $(3k)^{th}$ image signal to the first counting controller in response to an initial image modulated dot number from the microprocessor wherein the initial image modulated dot number storage gradually decreases one image dot in response to an image dot decreasing signal. The image dot decreasing coefficient storage is electrically connected to the microprocessor and the initial image modulated dot number storage for counting according to the horizontal sync-signal and an image dot decreasing coefficient from the microprocessor and outputting the image dot decreasing signal after the counting is finished.

Preferably, the initial image modulated dot number storage is a fourth counter and the fourth counter is a down-counter. The fourth counter includes a data input port for inputting the initial image modulated dot number to the first counting controller and a clock port for inputting the image dot decreasing signal.

Preferably, the image dot decreasing coefficient storage is a fifth counter and the fifth counter is a down-counter. The fifth counter includes a data input port for inputting the image dot decreasing coefficient, a clock port for inputting the horizontal sync-signal, and an output port for outputting the image dot decreasing signal to the initial image modulated dot number storage.

According to the present invention, the image dot decreasing signal is a positive or a negative pulse. The initial image modulated dot number is a dot number of a first or a third image signal and is changed with the projection angle $\theta$ and the number n of the horizontal image signal. The dot numbers of the first and the third image signals both are $n \times \tan \theta$. The image dot decreasing coefficient is an integer value of $\tan \theta$.

In accordance with the present invention, the digital keystone modulation circuit further includes a first data buffer for temporarily storing the initial image modulated dot number, a second data buffer for temporarily storing the image dot decreasing coefficient, and a third data buffer for temporarily storing the sum of the dot numbers of the $(3k-1)^{th}$, $(3k-1)^{th}$, and $(3k)^{th}$ image signals.

The present invention may best be understood through the following description with reference to the accompanying drawings, in which:

DETAILED DESCRIPTION OF THE PREFERRED EMBODIMENTS

Figure 1:
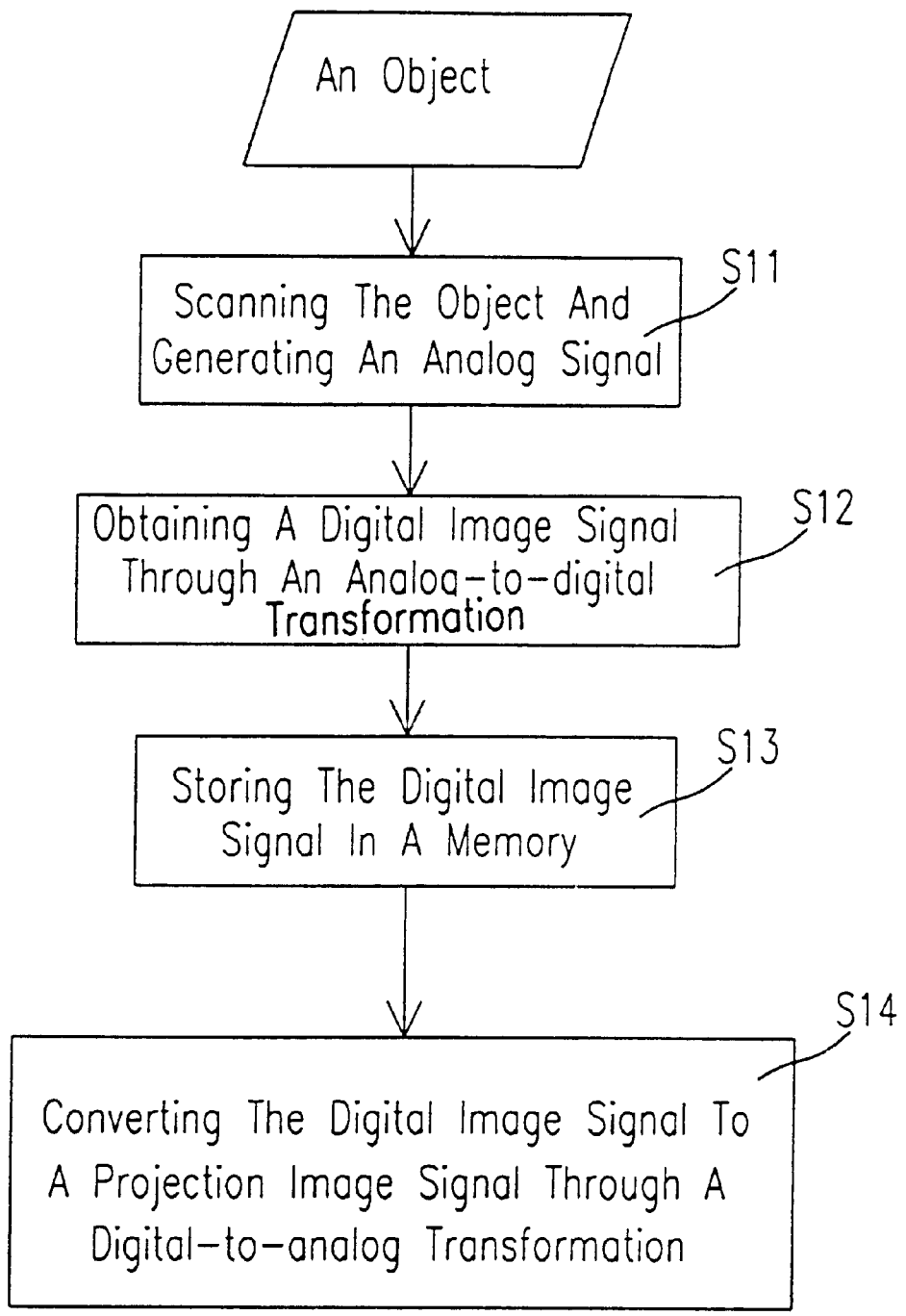
FIG. 1 is a flowchart showing the operating process of the conventional electronic projector.
Figure 2A:
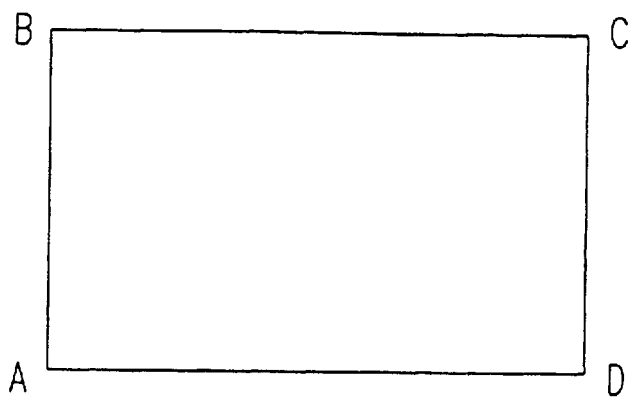
FIGS. 2 (a)~(c) schematically show a normal digital projection image, a digital projection image at an elevation projection angle, and a digital projection image at a dip projection angle respectively.
Figure 2B:
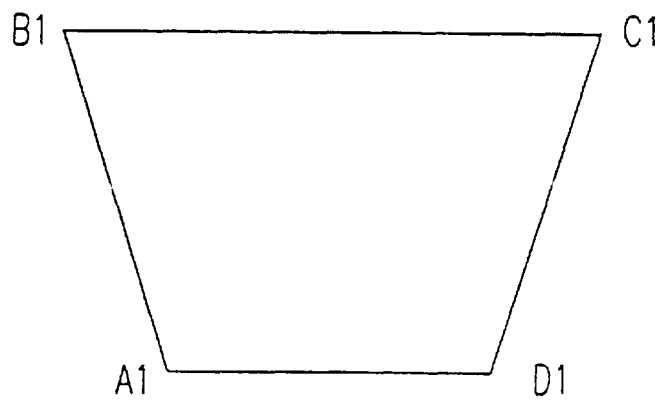
Figure 2C:
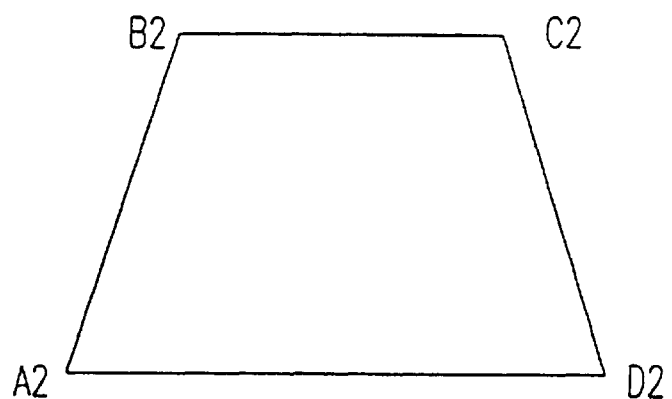
Figure 3:
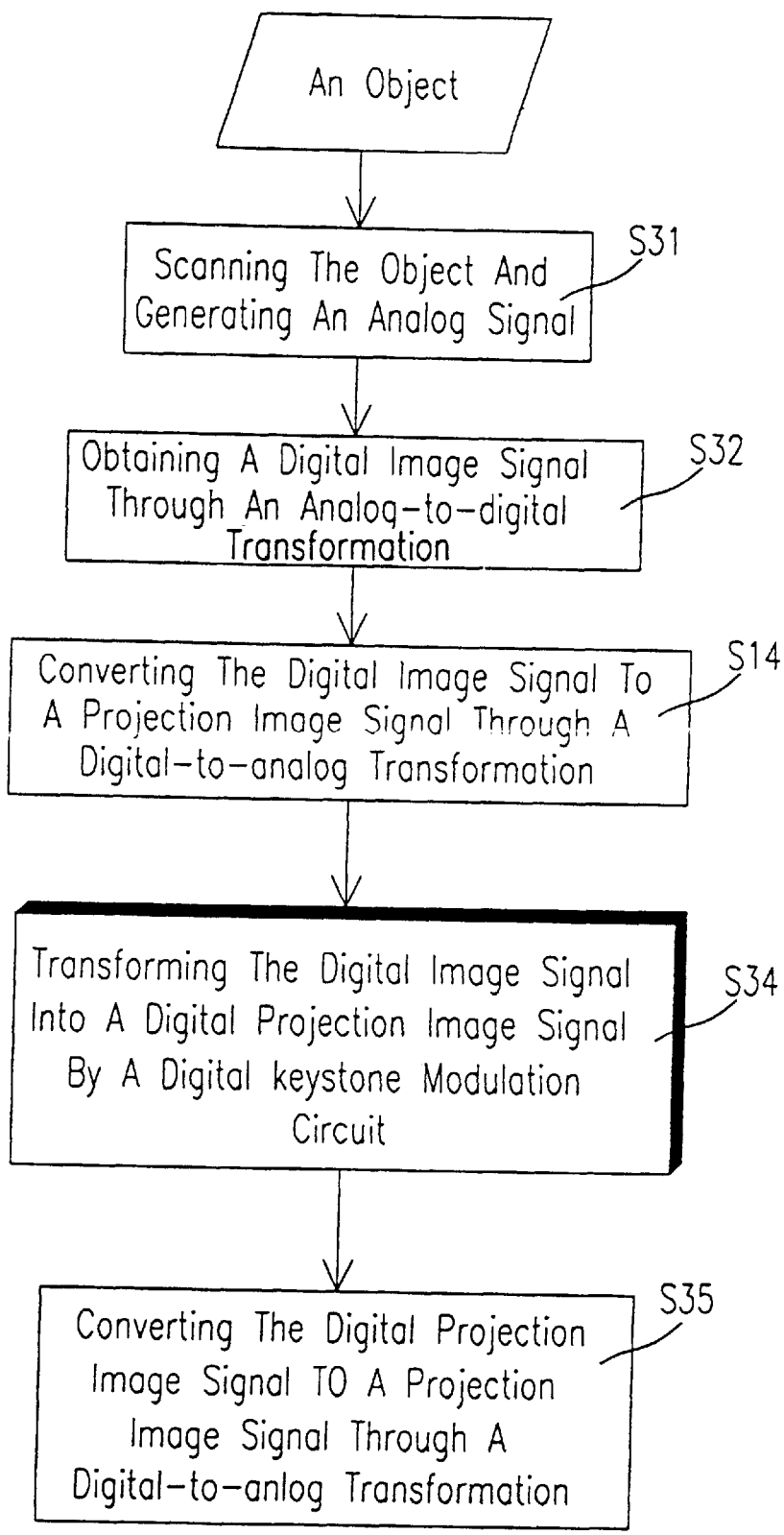
FIG. 3 is a flowchart showing the operating process of the electronic projector of the present invention.

The operating process of the electronic projector according to the present invention are shown in FIG. 3. At first, an analog signal is generated after scanning an object (step S31). Then, the analog signal is transformed into a digital image signal through an analog-to-digital transformation (step S32). Thereafter, the digital image signal is stored in a memory (step S33) and transformed into a digital projection image signal by the digital keystone modulation circuit (step 34). Finally, through a digital-to-analog transformation, the digital projection image signal is converted to a projection image signal projected on the display (step S35). Obviously, the keystone deformation of the digital image signal is modulated by the digital keystone modulation circuit at the step 34 and the detail method for solving the keystone deformation according to the present invention is shown in FIG. 4 and FIG. 5.

Figure 4:
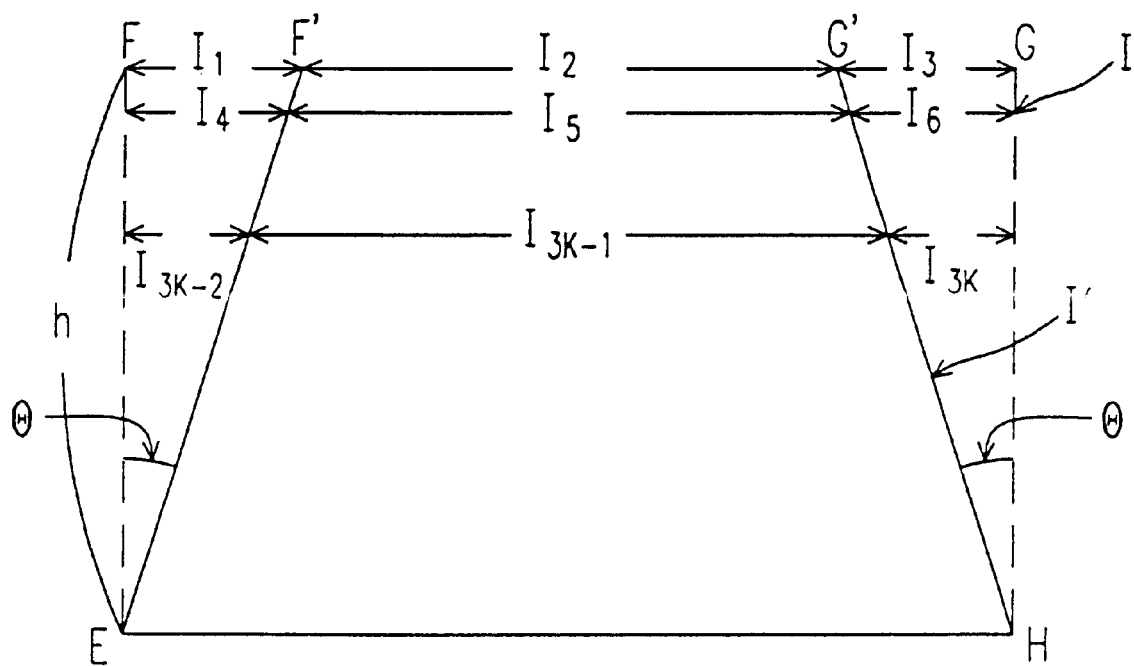
FIG. 4 schematically shows the method for solving the keystone deformation according to the present invention.

As shown in FIG. 4, the normal projection image I constructed by the four points F, G, H, and E is keystone-deformed at a projection angle $\theta$ to form the projection image I' constructed by the four points F', G', H, and E. Because the keystone deformation will not change the height h of the projection images I' and I, the number of the horizontal projection image signals n of the projection images I' and I are equal. Every horizontal projection image signal is made up of three parts of image signals, such as the image signals I1, I2, and I3 of the first horizontal projection image, the image signals I4, I5, and I6 of the second horizontal projection image and so on. Therefore, if the number of the horizontal projection image signal is n and k is any positive integer between 1 to n, the $k^{th}$ horizontal projection image signal will be made up of the $(3k-2)^{th}$, $(3k-1)^{th}$, and $(3k)^{th}$ image signals.

Figure 5:
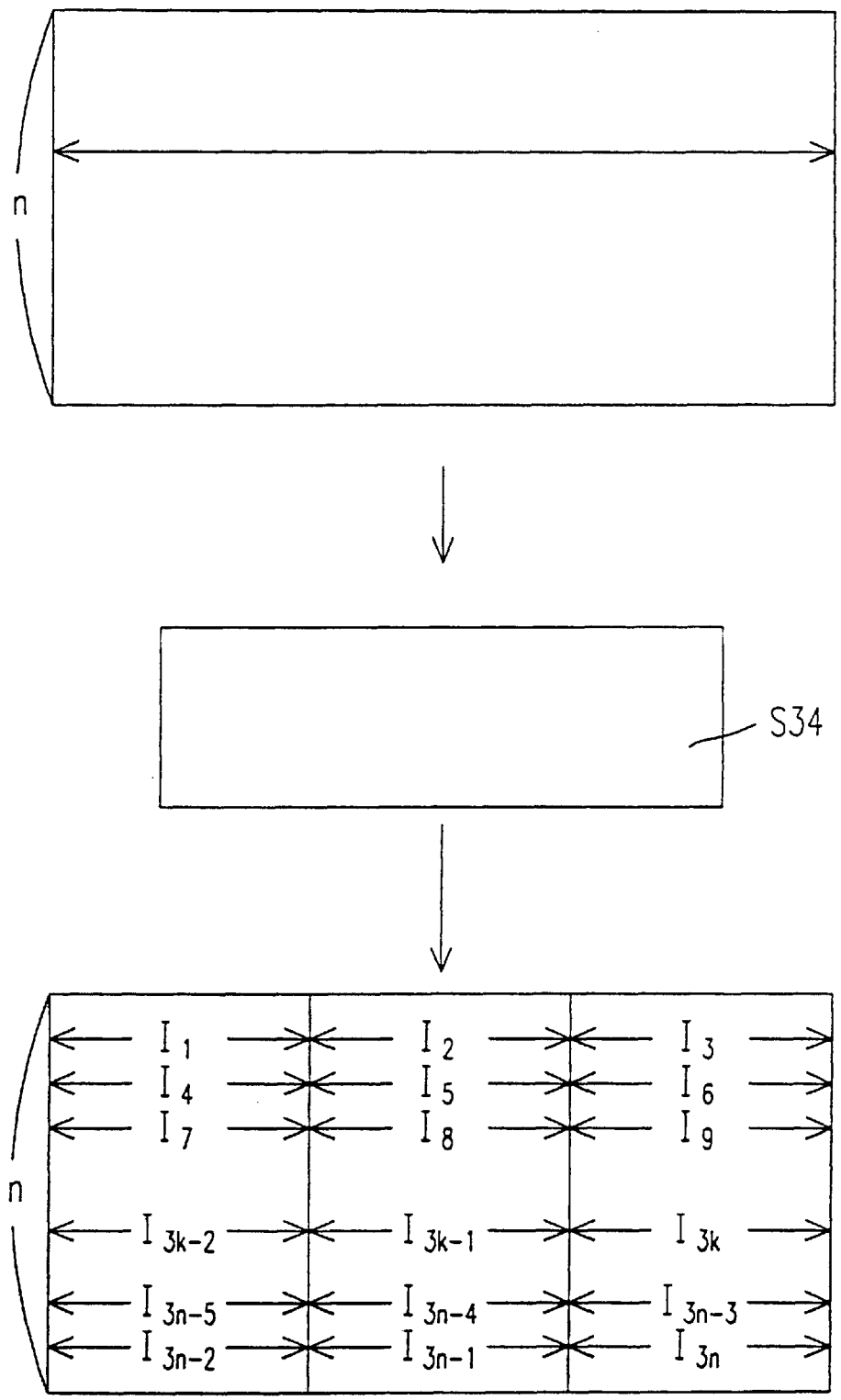
FIG. 5 detailedly illustrates the step S34 in FIG. 3 according to the present invention.

FIG. 5 detailedly illustrates the step 34 in FIG. 3. Because the horizontal projection image signal is formed from the horizontal image signal, the number of the horizontal image signals n is the same as that of the horizontal projection image signals n and the dot number of the $k^{th}$ horizontal image signal is equal to that of the $(_3k-1)^{th}$ image signal. In other words, the $(3k-1)^{th}$ image signal is the $k^{th}$ horizontal image signal. Generally, the number of the horizontal projection image signals n is 480 if the display is in VGA mode and 600 if the display is in SUGA mode.

Figure 6:
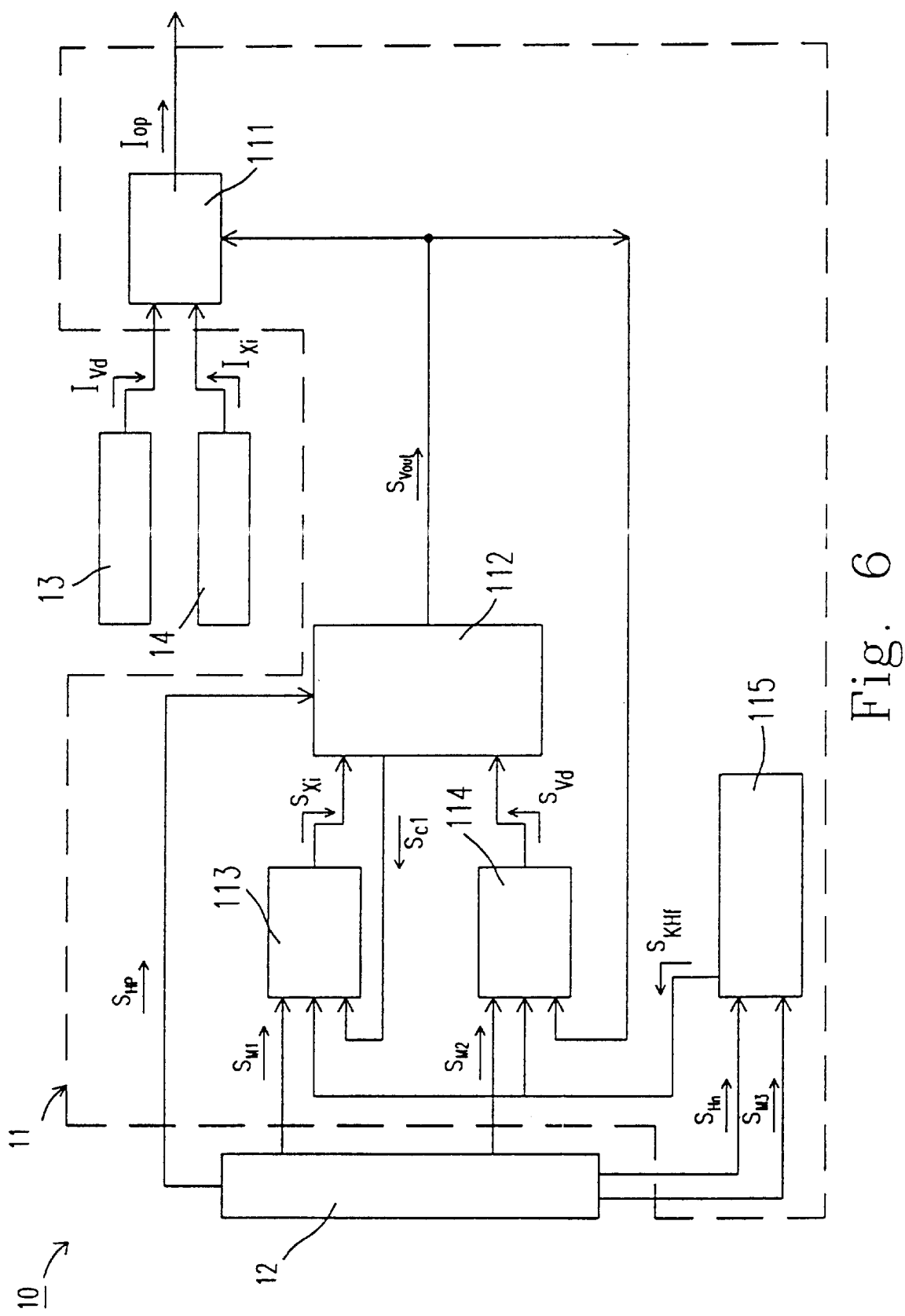
FIG. 6 illustrates a first preferred embodiment of the digital keystone modulation circuit according to the present invention.

FIG. 6 illustrates a first preferred embodiment of the digital keystone modulation circuit according to the present invention. The electronic projector 10 includes a digital keystone modulation circuit 11, a microprocessor 12, a memory 13, and a modulated signal generator 14. The digital keystone modulation circuit 11 includes an output controller 111, an output image selector 112, a first counting controller 113, a second counting controller 114, and a projection image frequency generator 115.

As shown in FIG. 6, the output controller 111 electrically connected to the memory 13 and the modulated signal generator 14 is used for outputting the $(3k-1)^{th}$ image signal $I_{Vd}$ and one of the $(3k-2)^{th}$ and $(3k)^{th}$ image signals $I_{Xi}$ in response to a first and a second state of an output image selected signal $S_{Vout}$ respectively. The $(3k-1)^{th}$ image signal $I_{Vd}$ is the $K^{th}$ horizontal image signal of the digital image saved in the memory 13, and the $(3k-2)^{th}$ and $(3k)^{th}$ image signals $I_{Xi}$ are black image signals generated from the modulated signal generator 14. The modulated signal generator 14 is preferably a grounded port. The $(3k-1)^{th}$ image signal $I_{Vd}$, and the $(3k-2)^{th}$ and $(3k)^{th}$ image signals $I_{Xi}$ constitute the $k^{th}$ horizontal projection image signal $I_{op}$ to be output. In addition, the first and the second states of the output image selected signal $S_{Vout}$ are a low voltage level and a high voltage level respectively or a high voltage level and a low voltage level respectively.

The output image selected signal $S_{Vout}$ is generated from an output image selector 112 which is electrically connected to the output controller 111 and the microprocessor 12. In response to a horizontal localization sync-signal $S_{HP}$ outputted from the microprocessor 12, the output image selector 112 outputs a first counting signal $S_C$ in an enable state and the output image selected signal $S_{Vout}$ in the second state.

Further, the first counting controller 113 electrically connected to the output image selector 112 and the microprocessor 12 is used for counting in response to the first counting signal $S_C$ in the enable state, a $k^{th}$ horizontal projection image frequency $S_{KHF}$, and a dot number of the $(3k-2)^{th}$ or the $(3k)^{th}$ image signal $S_{M1}$. The dot number of the $(3k-2)^{th}$ or the $(3k)^{th}$ image signal $S_{M1}$, is outputted from the microprocessor 12. After a first counting time, the first counting controller 113 outputs a first transforming signal $S_{xi}$ to transform the first counting signal $S_C$ into a disable state and the output image selected signal $S_{Vout}$ into the first state. The second counting controller 114 electrically connected to the output image selector 112 and the microprocessor 12 is used for counting in response to the output image selected signal $S_{Vout}$ in the first state, the $k^{th}$ horizontal projection image frequency $S_{KHF}$, and a dot number of the $(3k-1)^{th}$ image signal $S_{M2}$. The dot number of the $(3k-1)^{th}$ image signal $S_{M2}$ is outputted from the microprocessor 12. After a second counting time, the second counting controller 114 outputs a second transforming signal $S_{Vd}$ to transform the output image selected signal $S_{Vout}$ into the second state. As for the projection image frequency generator 115, it is electrically connected to the first counting controller 116 and the second counting controller 114 for outputting the $k^{th}$ horizontal projection image frequency $S_{KHF}$ into the first counting controller 116 and the second counting controller 114 in response to a horizontal sync-signal $S_{Hn}$ and a sum of the dot numbers of the $(3k-1)^{th}$, $(3k-1)^{th}$, and $(3k)^{th}$ image signals $S_{M3}$ from the microprocessor 12.

According to the present invention, the first counting time is the dot number of the $(3k-2)^{th}$ or $(3k)^{th}$ image signal $S_{M1}$ divided by the $k^{th}$ horizontal projection image frequency $S_{KHF}$, i.e. the first counting time=(1/ the $k^{th}$ horizontal projection image frequency $S_{KHF}$ )* the dot number of the $(3k-2)^{th}$ or $(3k)^{th}$ image signal $S_{M1}$. The second counting time is the dot number of the $(3k-1)^{th}$ image signal $S_{M2}$ divided by the $k^{th}$ horizontal projection image frequency $S_{KHF}$, i.e. the second counting time =(1/ the $k^{th}$ horizontal projection image frequency $S_{KHF}$ )* the dot number of the $(3k-1)^{th}$ image signal $S_{M2}$. In addition, the enable state and the disable state of the first counting signal $S_C$ can be a low voltage level and high voltage level respectively or a high voltage level and a low voltage level respectively. The first and the second transforming signals $S_{Xi}$, $S_{Vd}$ can be a positive pulse or a negative pulse.

Figure 7:
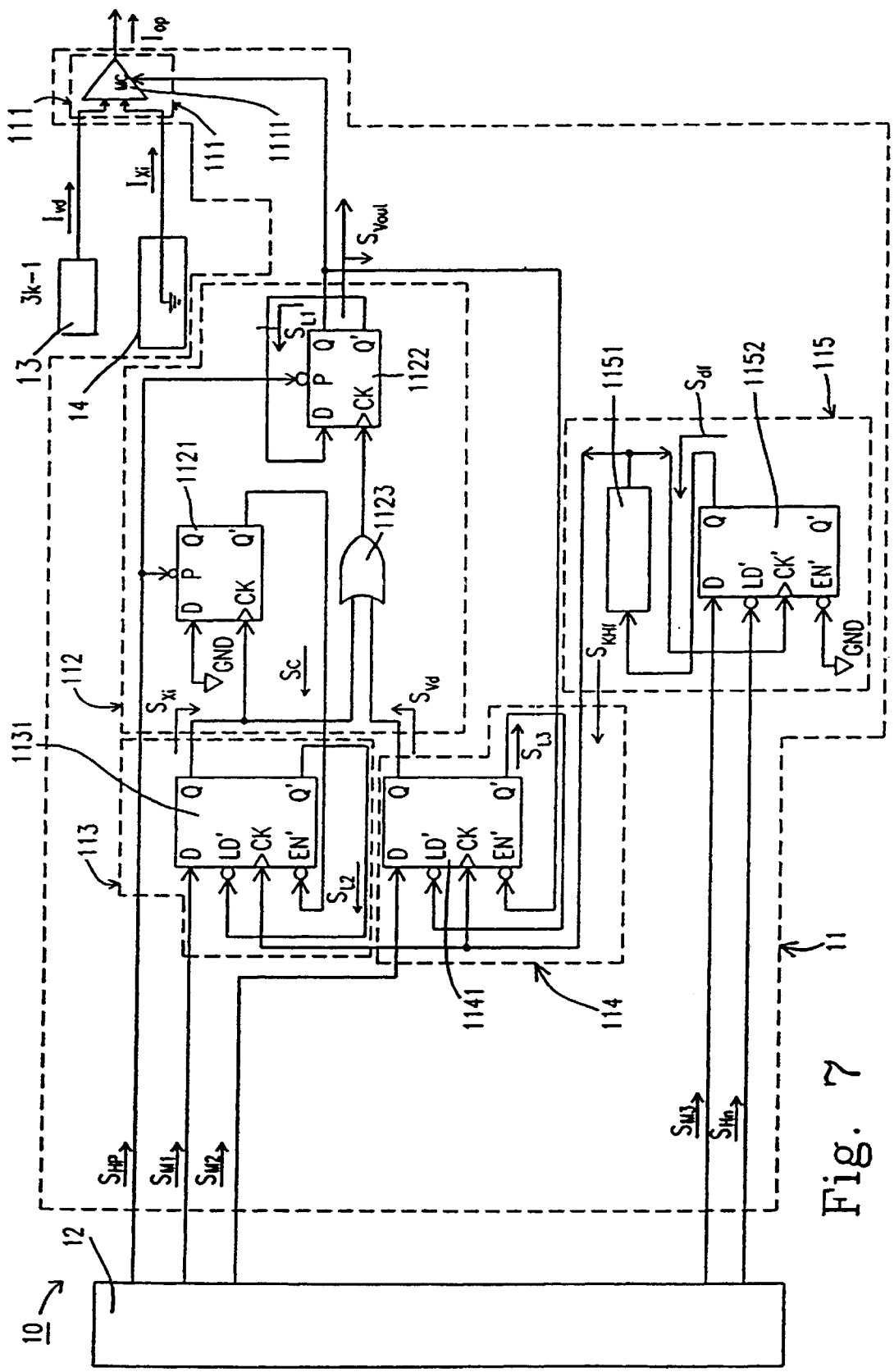
FIG. 7 illustrates the detailed digital keystone modulation circuit in FIG. 6 according to the present invention.

FIG. 7 is a more detailed circuitry according to the first embodiment of the digital keystone modulation circuit. The output controller 111 includes a 2-to-1 multiplexer 1111 having a multiplex output control port MC to input the output image selected signal $S_{Vout}$. The output image selector 112 includes a first flip-flop 1121, a second flip-flop 1122, and a transforming signal output controller 1123. The first flip-flop 1121 includes a pre-set port P for inputting the horizontal localization sync-signal $S_{HP}$, a data input port D for being grounded, a lock port CK for inputting the first transforming signal $S_{Xi}$, and an inverting output port Q' for outputting the first counting signal $S_C$. The second flip-flop 1122 includes a pre-set port P for inputting the horizontal localization sync-signal $S_{HP}$, a data input port D electrically connected to an inverting output port Q' for inputting a first input signal $S_{L1}$, a clock port CK for inputting the first and second transforming signals $S_{Xi}$, $S_{Vd}$, and an output port Q for outputting the output image selected signal $S_{Vout}$. In addition, the transforming signal output controller 1123 is preferably an assembling logic generator of an OR gate.

According to the present invention, the first counting controller 113 and the second counting controller 114 include a first counter 1131 and a second counter 1141 respectively. These counters are preferably down-counters. More specifically, the first counter 1131 includes a data input port D for inputting the dot numbers of the $(3k-2)^{th}$ and $(3k)^{th}$ image signal $S_{M1}$, a clock port CK for inputting the $k^{th}$ horizontal projection image frequency $S_{KHF}$, an enable port EN' for inputting the first counting signal $S_C$, a load port LD' electrically connected to an inverting output port Q' for inputting the second input signal $S_{L2}$, and an output port Q for outputting the first transforming signal $S_{Xi}$. The second counter 1141 includes a data input port D for inputting the dot number of the $(3k-1)^{th}$ image signal $S_{M2}$, a clock port CK for inputting the $k^{th}$ horizontal projection image frequency $S_{KHF}$, an enable port EN' for inputting the output image selected signal $S_{out}$, a load port LD' electrically connected to an inverting output port Q' for inputting the third input signal $S_{L3}$, and an output port Q for outputting the second transforming signal $S_{Vd}$.

Further, the projection image frequency generator 115 includes a phase-locked loop generator 1151 and a frequency divider 1152. The frequency divider 1152 includes a third counter, preferably a down-counter. The third counter 1152 includes a load port LD' for inputting the horizontal sync-signal $S_{Hn}$, a data input port D for inputting the sum of the dot numbers of the $(3k-2)^{th}$, $(3k-1)^{th}$, $(3k)^{th}$ image signals $S_{M3}$, a clock port CK for inputting the $k^{th}$ horizontal projection image frequency $S_{KHF}$, an enable port EN' for inputting an enable signal GND, and an output port Q for outputting a divided frequency $s_{df}$.

As shown in FIG. 7, the first flip-flop 1121 electrically connected to the microprocessor 12 and the first counting controller 113 is used for outputting the first counting signal $S_C$ in the enable state to the first counting controller 113 and transforming the first counting signal $S_C$ into the disable state according to the first transforming signal $S_{Xi}$. The second flip-flop 1122 is used for outputting the output image selected signal $S_{Vout}$ in the second state into the second counting controller 114 in response to the horizontal localization sync-signal $S_{HP}$ and into the output controller 111 to control the output of the $(3k-2)^{th}$ and $(3k)^{th}$ image signals $I_{Xi}$. The clock port CK of the second flip-flop 1122 can input the first and the second transforming signals $S_{Xi}$, $S_{Vd}$ from the OR gate 1123 to control the transformation of states of the output image selected signal $S_{Vout}$ and to control the output controller 111 to output the $(3k-2)^{th}$ and $(3k)^{th}$ image signals $I_{Xi}$ or the $(3k-1)^{th}$ image signal $I_{Vd}$.

The phase-locked loop generator 1151 electrically connected to the first and second counting controllers 113, 114 is used for outputting the $k^{th}$ horizontal projection image frequency $S_{KHF}$ to the first and second counting controllers 113, 114 in response to the divided frequency $S_{df}$. The frequency divider 1152 electrically connected to the phase-locked loop generator 1151 is used for outputting the divided frequency $S_{df}$ in response to the horizontal sync-signal $S_{Vn}$, the sum of the dot numbers of the $(3k-2)^{th}$, $(3k-1)^{th}$, and $(3k)^{th}$ image signals $S_{M3}$, and the $k^{th}$ horizontal projection image frequency $S_{KHF}$.

Figure 8:
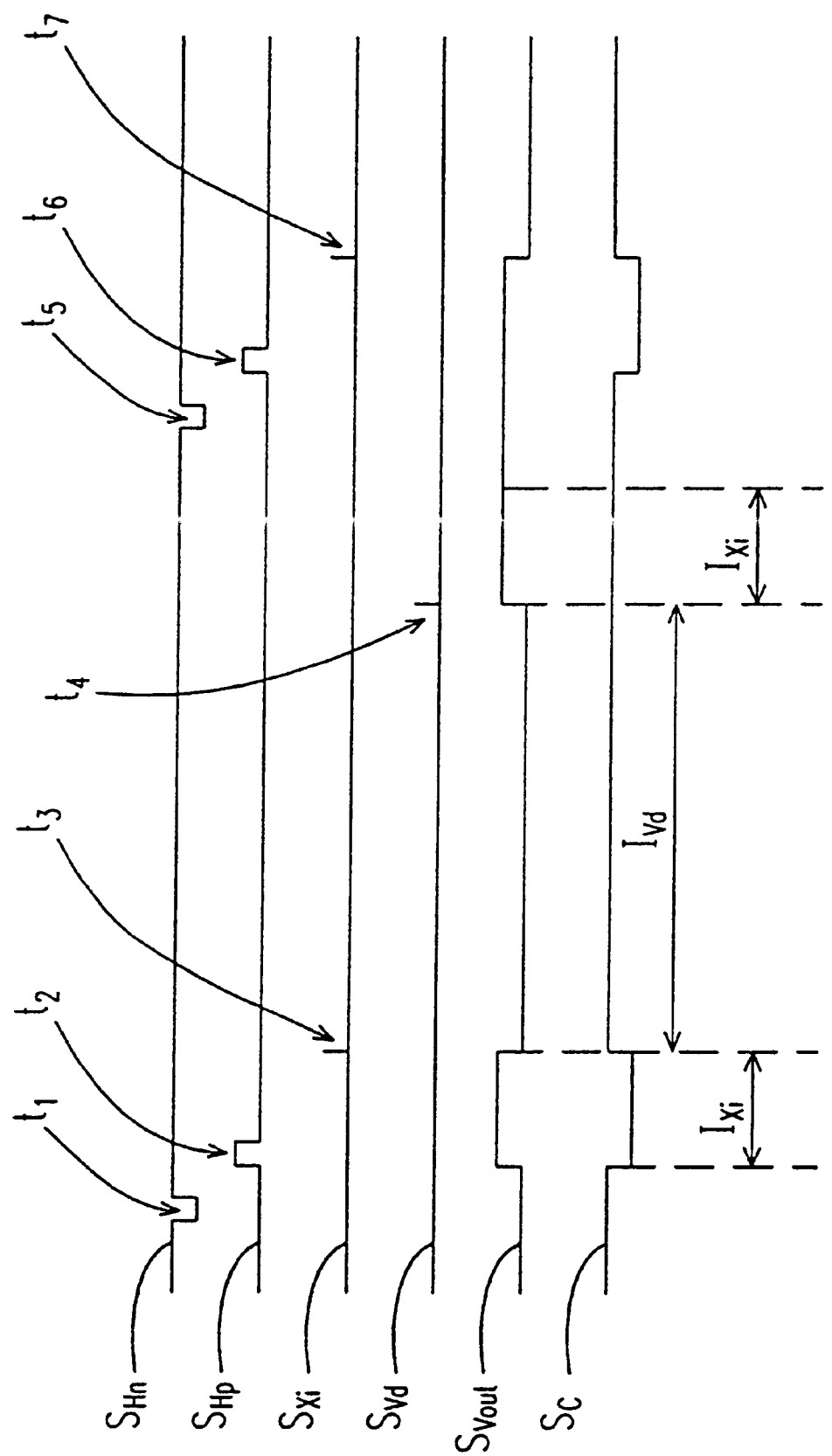
FIG. 8 is a waveform diagram of some signals according to the present invention.

FIG. 8 is a waveform diagram of the horizontal sync-signal $S_{Hn}$, the horizontal localization sync-signal $S_{HP}$, the first transforming signal $S_{Xi}$, the second transforming signal $S_{Vd}$, the output image selected signal $S_{Vout}$, and the first counting signal $S_C$ at different time. The detailed description of FIG. 8 is as follows:

At the Time Point t1:
The microprocessor 12 outputs the horizontal sync-signal $S_{Hn}$. For example, the horizontal sync-signal $S_{Hn}$ can be a negative pulse.

At the Time Point t2:
The horizontal localization sync-signal $S_{HP}$ is transformed in response to the horizontal sync-signal $S_{Hn}$. This horizontal localization sync-signal $S_{HP}$ can be a positive pulse. In this case, because the horizontal localization sync-signal $S_{HP}$ is directly outputted into the pre-set ports P of the first and second flip-flops 1121, 1122, the output image selected signal $S_{Vout}$ from the inverting output port Q' of the first flip-flop 1121 and the first counting signal $S_C$ from the output port Q of the second flip-flop 1122 are transformed into a high voltage signal and a low voltage signal respectively. Thereafter, the voltage levels of the output image selected signal $S_{Vout}$ and the first counting signal $S_C$ are maintained for a period. In this period, the output controller 111 is controlled to output the $(3k-2)^{th}$ image signal $I_{Xi}$.

At the Time Point t3:
Because the first counter 1131 outputs the first transforming signal $S_{Xi}$ after the counting is finished, the output image selected signal $S_{Vout}$ and the first counting signal $S_C$ are transformed into a low voltage level and a high voltage level respectively. Thereafter, the voltage levels of the output image selected signal $S_{Vout}$ and the first counting signal $S_C$ are maintained for a period. The output image selected signal $S_{Vout}$ with a low voltage level enables the second counter 1141 to count and output the second transforming signal $S_{Vd}$. Therefore, before the second counter 1141 finishes counting, the output controller 111 will receive the output image selected signal $S_{Vout}$ and be controlled to output the $(3k-1)^{th}$ image signal $I_{Vd}$.

At the Time Point t4:
After the second counter 1141 finishes counting, the second transforming signal $S_{Vd}$ is outputted from the second counting controller 114. As a result, the output image selected signal $S_{Vout}$ is transformed into a high voltage level to control the output controller 111 to output the $(3k)^{th}$ image signal $I_{Xi}$ until the next horizontal localization sync-signal $S_{HP}$ is received.

At the Time Point t5:
The microprocessor 12 outputs the horizontal sync-signal $S_{Hn}$ At the time point t6:
The horizontal localization sync-signal $S_{HP}$ is transformed in response to the horizontal sync-signal $S_{Hn}$. This horizontal localization sync-signal $S_{HP}$ can be a positive pulse. In this case, because the horizontal localization sync-signal $S_{HP}$ is directly outputted into the pre-set ports P of the first and second flip-flops 1121, 1122, the output image selected signal $S_{Vout}$ from the inverting output port Q' of the first flip-flop 1121 and the first counting signal $S_C$ from the output port Q of the second flip-flop 1122 are transformed into a high voltage level and a low voltage level respectively. Thereafter, the voltage levels of the output image selected signal $S_{Vout}$ and the first counting signal $S_C$ are maintained for a period. In this period, the output controller 111 is controlled to output the (3k−2)h image signal $I_{Xi}$.

At the Time Point t7:

Because the first counter 1131 outputs the first transforming signal $S_{Xi}$ after the counting is finished, the output image selected signal $S_{Vout}$ and the first counting signal $S_C$ is transformed into a low voltage level and a high voltage level respectively. Thereafter, the voltage levels of the output image selected signal $S_{Vout}$ and the first counting signal $S_C$ are maintained for a period. The output image selected signal $S_{Vout}$ with a low voltage level enables the second counter 1141 to count and output the second transforming signal $S_{Vd}$. Therefore, before the second counter 1141 finishes counting, the output controller 111 will receive the output image selected signal $S_{Vout}$ and be controlled to output the $(3k-1)^{th}$ image signal $I_{Vd}$.

Therefore, it is obvious that the $k^{th}$ horizontal image signal (i.e. the $(3k-1)^{th}$ image signal $I_{Vd}$) can be effectively compressed by the digital keystone modulation circuit 11, and the black image signals (i.e. the $(3k-2)^{th}$ and the $(3k)^t$ image signals $I_{Xi}$) on the right and left sides of the $K_{th}$ horizontal image signal can be effectively compensated by the digital keystone modulation circuit 11. As a result, the $k^{th}$ horizontal projection image signal is produced without the keystone deformation.

The dot numbers of the $(3k-2)^{th}$ and $(3k)^{th}$ image signals $S_{M1}$ are changed with the projection angle θ and the number n of the horizontal image signals and are numerated by the microprocessor 12. The dot numbers of the $(3k-2)^{th}$ and $(3k)^{th}$ image signals both are (n−k+1)×tan θ. In addition, the dot number of the $(3k-1)^{th}$ image signal $S_{M2}$ is the same as the dot number of the $k^{th}$ horizontal image signal (such as 640 dots).

Figure 9:
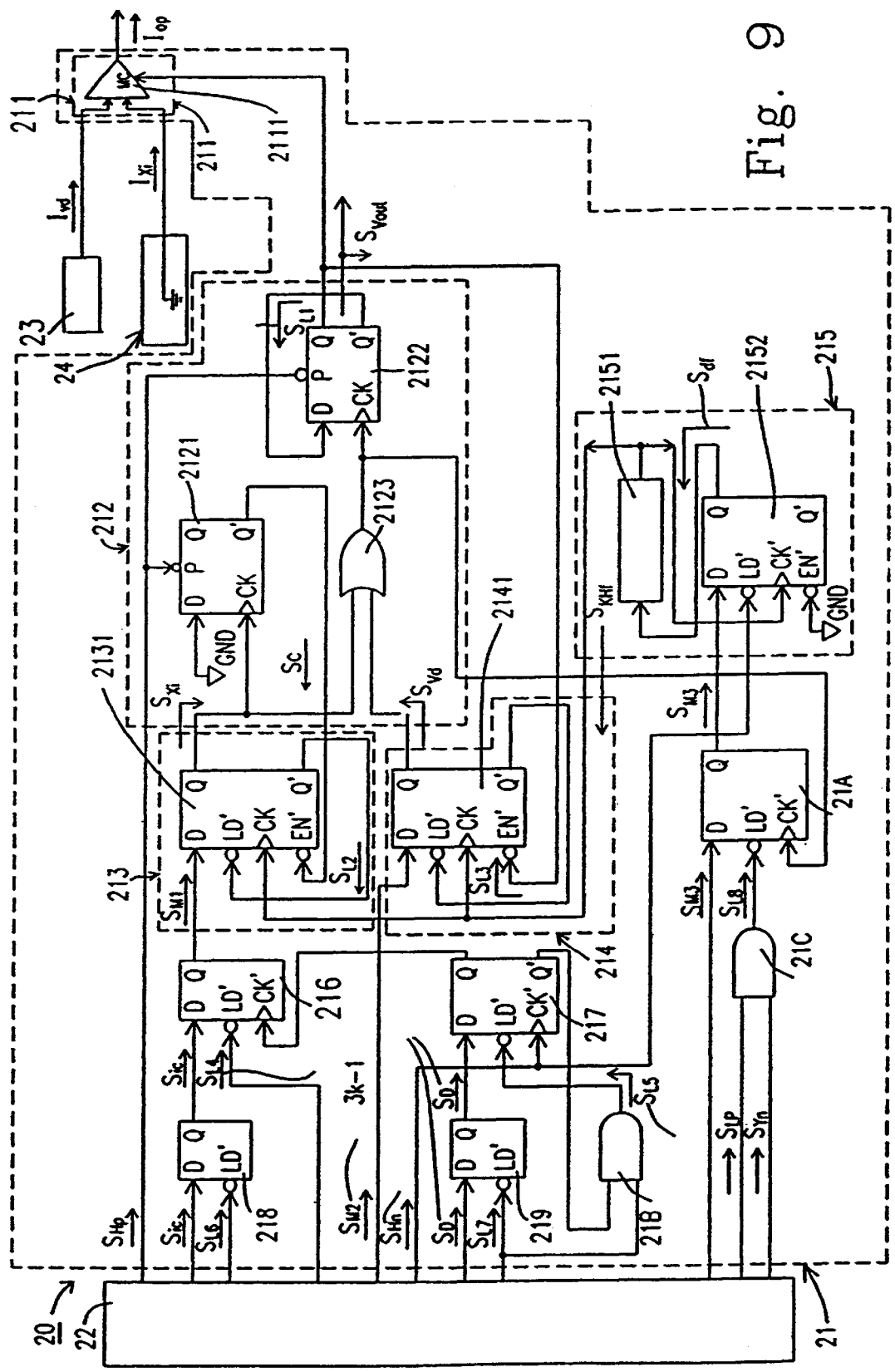
FIG. 9 illustrates a second preferred embodiment of the digital keystone modulation circuit according to the present invention.

The second preferred embodiment of the digital keystone modulation circuit is shown in FIG. 9. The microprocessor 22, the memory 23, the output controller 211, the output image selector 212, the first counting controller 213, the second counting controller 214, the projection image frequency generator 215, the 2-to-1 multiplexer 2111, the first flip-flop 2121, the second flip-flop 2122, the transforming signal output controller 2123, the counters 2131, 2141, the phase-locked loop generator 2151, and the frequency divider 2152 all are the same as those in FIG. 6 and FIG. 7.

By setting an initial image modulated dot number Sic and an image dot decreasing coefficient $S_D$, the digital keystone modulation circuit in FIG. 9 can numerate the dot number of the horizontal image signals immediately. Therefore, the outputting speed of the projection image signal is effectively increased.

As shown in FIG. 9, the digital keystone modulation circuit 21 further includes an initial image modulated dot number storage 216 and an image dot decreasing coefficient storage 217. The initial image modulated dot number storage 216 electrically connected to the first counting controller 213 and the microprocessor 22 is used for outputting the dot number of the $(3k-2)^{th}$ or $(3k)^{th}$ image signal $S_{M1}$ to the first counting controller 213 in response to an initial image modulated dot number $S_{ic}$ inputted from the microprocessor 22. The initial image modulated dot number storage 216 gradually decreases 1 image dot in response to an image dot decreasing signal $S_{id}$. The image dot decreasing coefficient storage 217 electrically connected to the initial image modulated dot number storage 216 and the micro processor 22 is used for counting in response to the horizontal sync-signal $S_{Hn}$ and an image dot decreasing coefficient $S_D$ and outputting the image dot decreasing signal $S_{id}$ after the counting is finished. The image dot decreasing coefficient storage 217 gradually decrease 1 image dot of the initial image modulated dot number $S_{ic}$ when the output number of the $k^{th}$ horizontal projection image signal $I_{op}$ gradually increases a number of the image dot decreasing coefficient $S_D$.

The initial image modulated dot number storage 216 includes a fourth counter, preferably a down-counter. The fourth counter 216 includes a data input port D for inputting the initial image modulated dot number $S_{ic}$, an output port Q for outputting the initial image modulated dot number $S_{ic}$ to the first counting controller 213, a load port LD' for inputting a fourth input signal $S_{L4}$ to enable the input of the initial image modulated dot number $S_{ic}$, and a clock port CK for inputting the image dot decreasing signal $S_{id}$.

The image dot decreasing coefficient storage 217 includes a fifth counter, preferably a down-counter. The fifth counter 217 includes a data input port D for inputting the image dot decreasing coefficient $S_D$, a load port LD' for inputting a fifth input signal $S_{L5}$ to enable the input of the image dot decreasing coefficient $S_D$, a clock port CK for outputting the horizontal sync-signal $S_{Hn}$, and an output port Q for outputting the image dot decreasing signal $S_{id}$ to the initial image modulated dot number storage 216.

According to the present invention, the image dot decreasing signal $S_{id}$ can be a positive pulse or a negative pulse. The initial image modulated dot number $S_{ic}$ can be a dot number of the first or third image signal. The initial image modulated dot number $S_{ic}$ is changed with the projection angle θ and a number n of the horizontal image signals because both of the dot numbers of the first and third image signals are n×tan θ. In addition, the image dot decreasing coefficient $S_D$ is an integer value of tan θ.

In addition, the digital keystone modulation circuit further includes a first, a second, and a third data buffers 218, 219, 21A. The first data buffer 218 electrically connected to the microprocessor 22 and the initial image modulated dot number storage 216 is used for temporarily storing the initial image modulated dot number $S_{ic}$. A sixth input signal $S_{L6}$ is inputted into the first data buffer 218 from a load port LD' to enable the input of the initial image modulated dot number $S_{ic}$. The second data buffer 219 electrically connected to the microprocessor 22 and the image dot decreasing coefficient storage 217 is used for temporarily storing the image dot decreasing coefficient $S_D$. A seventh input signal $S_{L7}$ is inputted into the second data buffer 219 from a load port LD' to enable the input of the image dot decreasing coefficient $S_D$. The third data buffer 21A electrically connected to the microprocessor 22 and the projection image frequency generator 215 is used for temporarily storing the sum of the dot numbers of the $(3k-2)^{th}$, $(3k-1)^{th}$, $(3k)^{th}$ image signals $S_{M3}$. An eighth input signal $S_{L8}$ is inputted into the third data buffer 21A from a load port LD' to enable the input of the sum of the dot numbers of the $(3k-2)^{th}$, the $(3k-1)^{th}$, the $(3k)^{th}$ image signals $S_{M3}$.

As shown in FIG. 9, the first OR gate 21B is used for inputting the seventh input signal $S_{L7}$ and an invert signal of the image dot decreasing signal $S_{id}$ to output the fifth input signal $S_{L5}$. The invert signal of the image dot decreasing signal $S_{id}$ is inputted from an inverting output port Q' of the image dot decreasing coefficient storage 217. The second OR gate 21C is used for inputting an input localization signal $S_{LP}$ and a vertical sync-signal $S_{Yn}$ to output the eighth input signal $S_{L8}$.

In conclusion, the digital keystone modulation circuit of the present invention can effectively modulate the keystone deformation without increasing the cost. Therefore, the digital keystone modulation circuit of the present invention is very useful.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A digital keystone modulation circuit for transforming a digital image to a digital projection image wherein said digital image and said digital projection image have n horizontal image signals and n horizontal projection image signals respectively and n is a positive integer, said digital keystone modulation circuit comprising:

an output controller for outputting a $(3k-1)^{th}$ image signal and one of a $(3k-2)^{th}$ and $(3k)^{th}$ image signal in response to a first and a second state of an output image selected signal respectively wherein said $(3k-2)^{th}$, said $(3k-1)^{th}$, and said $(3k)^{th}$ image signals make up a $k^{th}$ horizontal projection image signal wherein k is a positive integer, $1 \leq k \leq n$ and said $(3k-1)^{th}$ image signal is a $k^{th}$ horizontal image signal;

an output image selector electrically connected to said output controller for outputting a first counting signal in an enable state and said output image selected signal in said second state in response to a horizontal localization sync-signal;

a first counting controller electrically connected to said output image selector, counting in response to said first counting signal in said enable state, a $k^{th}$ horizontal projection image frequency, and a dot number of one of said $(3k-2)^{th}$ and $(3k)^{th}$ image signal, and outputting a first transforming signal to transform said first counting signal into a disable state and said output image selected signal into said first state after a first counting time;

a second counting controller electrically connected to said output image selector, counting in response to said output image selected signal in said first state, said $k^{th}$ horizontal projection image frequency, and a dot number of said $(3k-1)^{th}$ image signal and outputting a second transforming signal to transform said output image selected signal into said second state after a second counting time; and a projection image frequency generator electrically connected to said first counting controller and said second counting controller for outputting said $k^{th}$ horizontal projection image frequency in response to a horizontal sync-signal and a sum of said dot numbers of said $(3k-2)^{th}$, said $(3k-1)^{th}$, and said $(3k)^{th}$ image signals.

2. The circuit according to claim 1, wherein said horizontal localization sync-signal and said dot numbers of said $(3k-2)^{th}$, said $(3k-1)^{th}$, and said $(3k)^{th}$ image signals are provided by a microprocessor.

3. The circuit according to claim 1, wherein said $(3k-2)^{th}$ and said $(3k)^{th}$ image signal are black image signals.

4. The circuit according to claim 1 further comprising a memory and a modulated signal generator.

5. The circuit according to claim 4, wherein said modulated signal generator is a grounded port and said digital image is stored in said memory.

6. The circuit according to claim 1, wherein said output controller comprises a multiplexer.

7. The circuit according to claim 6, wherein said multiplexer is a 2-to-1 multiplexer having a multiplex output control port to input said output image selected signal.

8. The circuit according to claim 1, wherein said first state and said second state of said output image selected signal are a low voltage level and a high voltage level respectively.

9. The circuit according to claim 1, wherein said first state and said second state of said output image selected signal are a high voltage level and a low voltage level respectively.

10. The circuit according to claim 1, wherein said output image selector comprises:

a first flip-flop electrically connected to said first counting controller for outputting said first counting signal in said enable state to said first counting controller in response to said horizontal localization sync-signal, and transforming said first counting signal into said disable state in response to said first transforming signal;

a second flip-flop electrically connected to said second counting controller and said output controller for outputting said output image selected signal in said second state into said second counting controller in response to said horizontal localization sync-signal and into said output controller to control said output of said one of said $(3k-2)^{th}$ and $(3k)^{th}$ image signal; and a transforming signal output controller electrically connected to said first counting controller, said second counting controller, and said second flip-flop for logically controlling said outputs of said first transforming signal and said second transforming signal to control the transformation of states of said output image selected signal.

11. The circuit according to claim 10, wherein said first flip-flop comprises a pre-set port for inputting said horizontal localization sync-signal, a data input port for being grounded, a clock port for inputting said first transforming signal, and an inverting output port for outputting said first counting signal.

12. The circuit according to claim 10, wherein said second flip-flop comprises a pre-set port for inputting said horizontal localization sync-signal, a data input port, an inverting output port electrically connected to said data input port, a clock port for inputting said first and said second transforming signals, and an output port for outputting said output image selected signal.

13. The circuit according to claim 10, wherein said transforming signal output controller is an assembling logic generator.

14. The circuit according to claim 13, wherein said assembling logic generator is an OR gate.

15. The circuit according to claim 1, wherein said first counting controller comprises a first counter.

16. The circuit according to claim 15, wherein said first counter is a down-counter.

17. The circuit according to claim 15, wherein said first counter comprises a data input port for inputting said dot numbers of said $(3k-2)^{th}$ and said $(3k)^{th}$ image signal, a clock port for inputting said $k^{th}$ horizontal projection image frequency, an enable port for inputting said first counting signal, and an output port for outputting said first transforming signal.

18. The circuit according to claim 1, wherein said second counting controller comprises a second counter.

19. The circuit according to claim 18, wherein said second counter is a down-counter.

20. The circuit according to claim 18, wherein said second counter comprises a data input port for inputting said dot number of said $(3k-1)^{th}$ image signal, a clock port for inputting said $k^{th}$ horizontal projection image frequency, an enable port for inputting said output image selected signal, and an output port for outputting said second transforming signal.

21. The circuit according to claim 1, wherein said first counting time is one of said dot number of said $(3k-2)^{th}$ and $(3k)^{th}$ image signal divided by said $k^{th}$ horizontal projection image frequency.

22. The circuit according to claim 1, wherein said second counting time is said dot number of said $(3k-1)^{th}$ image signal divided by said $k^{th}$ horizontal projection image frequency.

23. The circuit according to claim 1, wherein said enable state and said disable state of said first counting signal are a low voltage level and a high voltage level respectively.

24. The circuit according to claim 1, wherein said enable state and said disable state of said first counting signal are a high voltage level and a low voltage level respectively.

25. The circuit according to claim 1, wherein said first transforming signal is one of a positive pulse and a negative pulse.

26. The circuit according to claim 1, wherein said second transforming signal is one of a positive pulse and a negative pulse.

27. The circuit according to claim 1, wherein said projection image frequency generator comprises:

a phase-locked loop generator electrically connected to said first counting controller and said second counting controller for outputting said $k^{th}$ horizontal projection image frequency to said first and said second counting controllers in response to a divided frequency; and a frequency divider electrically connected to said phase-locked loop generator for outputting said divided frequency in response to said horizontal sync-signal, said sum of said dot numbers of said $(3k-2)^{th}$, said $(3k-2)^{th}$, and said $(3k)^{th}$ image signals, and said $k^{th}$ horizontal projection image frequency.

28. The circuit according to claim 27, wherein said frequency divider comprises a third counter.

29. The circuit according to claim 28, wherein said third counter is a down-counter.

30. The circuit according to claim 28, wherein said third counter comprises a load port for inputting said horizontal sync-signal, a data input port for inputting said sum of said dot numbers of said $(3k-2)^{th}$, said $(3k-1)^{th}$, said $(3k)^{th}$ image signals, a clock port for inputting said $k^{th}$ horizontal projection image frequency, an enable port for inputting an enable signal, and an output port for outputting said divided frequency.

31. The circuit according to claim 1, wherein said dot numbers of said $(3k-2)^{th}$ and said $(3k)^{th}$ image signals are changed with a projection angle θ and a number n of said horizontal image signals.

32. The circuit according to claim 30, wherein said dot numbers of said $(3k-2)^{th}$ and said $(3k)^{th}$ image signals both are $(n-k+1)\times\tan θ$.

33. The circuit according to claim 1 further comprising:

an initial image modulated dot number storage electrically connected to said first counting controller for outputting said one of said dot number of said $(3k-2)^{th}$ and said $(3k)^{th}$ image signal to said first counting controller in response to an initial image modulated dot number wherein said initial image modulated dot number storage gradually decreases 1 image dot in response to an image dot decreasing signal; and an image dot decreasing coefficient storage electrically connected to said initial image modulated dot number storage for counting in response to said horizontal sync-signal and an image dot decreasing coefficient, and outputting said image dot decreasing signal after said counting is finished.

34. The circuit according to claim 33, wherein said initial image modulated dot number storage comprises a fourth counter.

35. The circuit according to claim 34, wherein said fourth counter is a down-counter.

36. The circuit according to claim 34, wherein said fourth counter comprises a data input port for inputting said initial image modulated dot number, an output port for outputting said initial image modulated dot number to said first counting controller, and a clock port for inputting said image dot decreasing signal.

37. The circuit according to claim 33, wherein said image dot decreasing coefficient storage comprises a fifth counter.

38. The circuit according to claim 37, wherein said fifth counter is a down-counter.

39. The circuit according to claim 37, wherein said fifth counter comprises a data input port for inputting said image dot decreasing coefficient, a clock port for inputting said horizontal sync-signal, and an output port for outputting said image dot decreasing signal to said initial image modulated dot number storage.

40. The circuit according to claim 33, wherein said image dot decreasing signal is one of a positive pulse and a negative pulse.

41. The circuit according to claim 33, wherein said initial image modulated dot number is one of a dot number of a first and a third image signal and is changed with said projection angle θ and a number n of said horizontal image signals.

42. The circuit according to claim 41, wherein said dot numbers of said first and said third image signals are $n\times\tan θ$.

43. The circuit according to claim 41, wherein said image dot decreasing coefficient is an integer value of $\tan θ$.

44. The circuit according to claim 33, further comprising a first data buffer electrically connected to said initial image modulated dot number storage for temporarily storing said initial image modulated dot number.

45. The circuit according to claim 32 further comprising a second data buffer electrically connected to said image dot decreasing coefficient storage for temporarily storing said image dot decreasing coefficient.

46. The circuit according to claim 32 further comprising a third data buffer electrically connected to said projection image frequency generator for temporarily storing said sum of said dot numbers of said $(3k-2)^{th}$, said $(3k-1)^{th}$, and said $(3k)^{th}$ image signals.

* * * * *